US012613598B2

(12) United States Patent
Sato et al.

(10) Patent No.: US 12,613,598 B2
(45) Date of Patent: Apr. 28, 2026

(54) COORDINATE INPUT DEVICE

(71) Applicant: Alps Alpine Co., Ltd., Tokyo (JP)

(72) Inventors: Akira Sato, Miyagi-ken (JP); Satoshi Nakajima, Miyagi-ken (JP); Tomohiro Sasaki, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 19/265,312

(22) Filed: Jul. 10, 2025

(65) Prior Publication Data

US 2025/0341921 A1     Nov. 6, 2025

Related U.S. Application Data

(63) Continuation of application No. PCT/JP2023/038170, filed on Oct. 23, 2023.

(30) Foreign Application Priority Data

Jan. 18, 2023     (JP) ................................. 2023-005965

(51) Int. Cl.
*G06F 3/041* (2006.01)
*G06F 3/044* (2006.01)

(52) U.S. Cl.
CPC ...... *G06F 3/04186* (2019.05); *G06F 3/04164* (2019.05); *G06F 3/04166* (2019.05); *G06F 3/0446* (2019.05); *G06F 2203/04108* (2013.01)

(58) Field of Classification Search
None
See application file for complete search history.

(56) References Cited

U.S. PATENT DOCUMENTS

2012/0319994 A1    12/2012  Hatano
2018/0088732 A1*    3/2018  Kim ...................... G06F 3/0418
(Continued)

FOREIGN PATENT DOCUMENTS

JP          2010-191778          9/2010
JP          2012-198607          10/2012
(Continued)

OTHER PUBLICATIONS

International Search Report with translation and Written Opinion dated Dec. 26, 2023 from International Application No. PCT/JP2023/038170.

*Primary Examiner* — Nicholas J Lee
(74) *Attorney, Agent, or Firm* — Beyer Law Group LLP

(57) ABSTRACT

A coordinate input device includes sensor electrodes, a top panel having an operation surface operable by an operation body and covering the sensor electrodes, a measurement circuit configured to measure a capacitance at each of detection points, and a calculation circuit to calculate a position of the operation body on the operation surface based on the measured values of the capacitance at the detection points. The calculation circuit, for each of three or more measured values including the maximum value of the measured values obtained at the detection points, calculates a first corrected measured value to reduce differences between the measured values, and calculates the position of the operation body in two-axis directions on the operation surface using the first corrected measured value corresponding to the maximum value and the first corrected measured values corresponding to the measured values adjacent to the maximum value in one of the two-axis directions.

15 Claims, 13 Drawing Sheets

(56)         References Cited

U.S. PATENT DOCUMENTS

2020/0401267  A1     12/2020   Hosaka et al.
2023/0297198  A1 *    9/2023   Yamaguchi  ........... G06F 3/0446
                                                345/173

FOREIGN PATENT DOCUMENTS

JP          2013-003978       1/2013
JP          2021-106060       7/2021

* cited by examiner

FIG. 7A

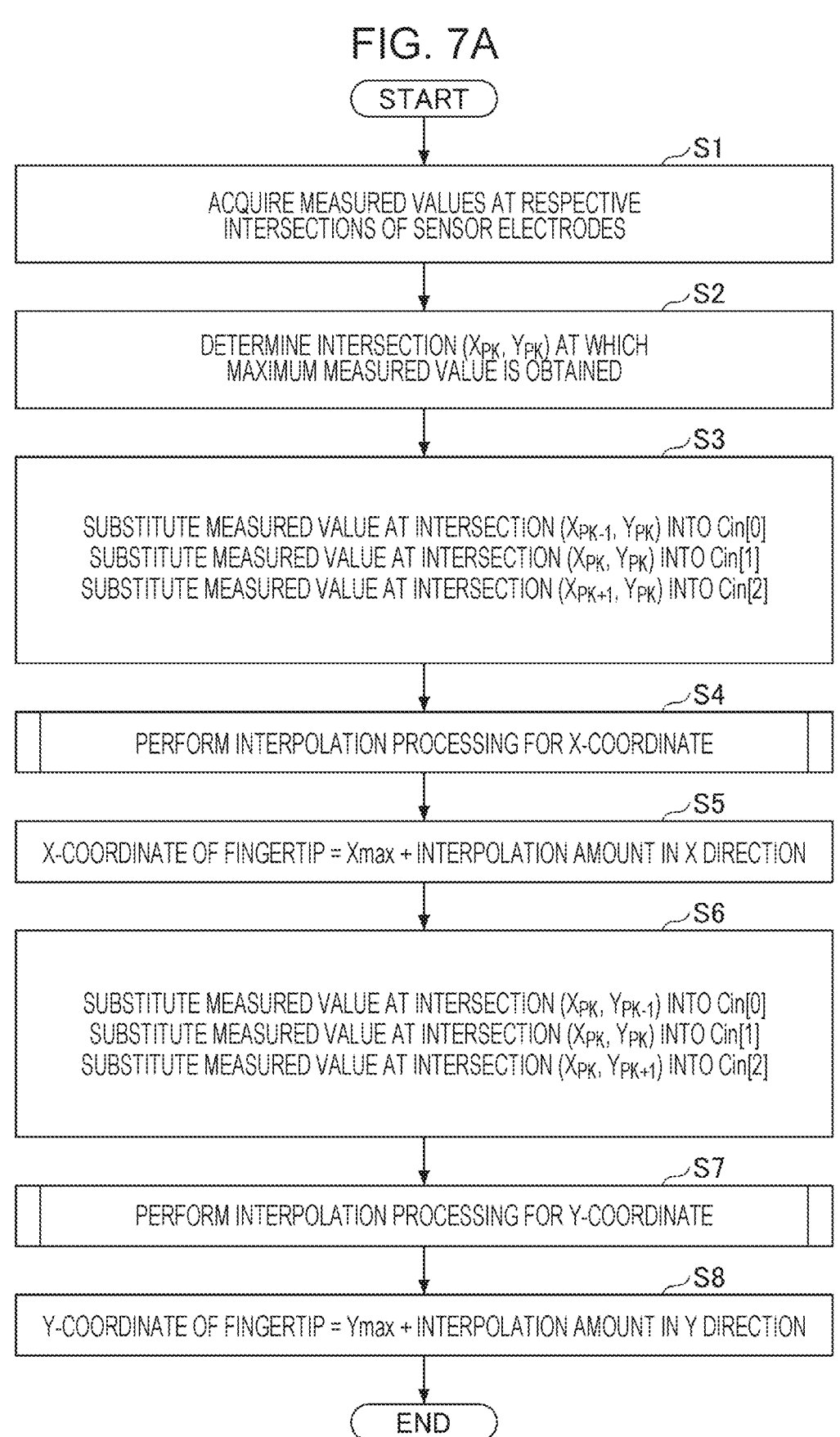

START

S1
ACQUIRE MEASURED VALUES AT RESPECTIVE
INTERSECTIONS OF SENSOR ELECTRODES

S2
DETERMINE INTERSECTION $(X_{PK}, Y_{PK})$ AT WHICH
MAXIMUM MEASURED VALUE IS OBTAINED

S3
SUBSTITUTE MEASURED VALUE AT INTERSECTION $(X_{PK-1}, Y_{PK})$ INTO Cin[0]
SUBSTITUTE MEASURED VALUE AT INTERSECTION $(X_{PK}, Y_{PK})$ INTO Cin[1]
SUBSTITUTE MEASURED VALUE AT INTERSECTION $(X_{PK+1}, Y_{PK})$ INTO Cin[2]

S4
PERFORM INTERPOLATION PROCESSING FOR X-COORDINATE

S5
X-COORDINATE OF FINGERTIP = Xmax + INTERPOLATION AMOUNT IN X DIRECTION

S6
SUBSTITUTE MEASURED VALUE AT INTERSECTION $(X_{PK}, Y_{PK-1})$ INTO Cin[0]
SUBSTITUTE MEASURED VALUE AT INTERSECTION $(X_{PK}, Y_{PK})$ INTO Cin[1]
SUBSTITUTE MEASURED VALUE AT INTERSECTION $(X_{PK}, Y_{PK+1})$ INTO Cin[2]

S7
PERFORM INTERPOLATION PROCESSING FOR Y-COORDINATE

S8
Y-COORDINATE OF FINGERTIP = Ymax + INTERPOLATION AMOUNT IN Y DIRECTION

END

INTERPOLATION
PROCESSING FOR
COORDINATE

S11

$i = 0$

S12

CALCULATE WEIGHT

S13

CALCULATE FIRST CORRECTED
MEASURED VALUE FOR Cin[i]

S14

CALCULATE SECOND CORRECTED
MEASURED VALUE FOR Cin[i]

S15

$i = i + 1$

S16

$i \geq 3?$          NO

YES

S17

$$D = \frac{C_{pk-1} - C_{pk+1}}{(C_{pk-1} + C_{pk+1} - 2 \times C_{pk}) \times 2} \times RES$$

END

COORDINATE INPUT DEVICE

CLAIM OF PRIORITY

This application is a Continuation of International Application No. PCT/JP2023/038170 filed on Oct. 23, 2023, which claims benefit of Japanese Patent Application No. 2023-005965 filed on Jan. 18, 2023. The entire contents of each application noted above are hereby incorporated by reference.

BACKGROUND OF THE INVENTION

1. Field of the Invention

The present disclosure relates to a coordinate input device.

2. Description of the Related Art

A known coordinate input device includes a plurality of electrodes arranged in a predetermined direction, a detecting unit configured to detect the capacitance of each of the plurality of electrodes, and an arithmetic processing unit configured to calculate the coordinates of a detection target using different calculation methods according to the state of a variation in the capacitance of the plurality of electrodes. The arithmetic processing unit calculates the coordinates of the detection target, using one of a centroid calculation method of calculating the coordinates of the centroid and a curve approximation method of calculating a peak of a curve according to a comparison value between a capacitance variation of a peak electrode and a capacitance variation of an electrode which is not adjacent to the peak electrode (see, for example, Japanese Unexamined Patent Application Publication No. 2013-003978).

In such a coordinate input device, when larger sensor electrodes are used, the detection sensitivity to the operation surface, on which the user performs an operation using an operation body such as a hand or the like, can be increased in a non-contact state. However, in the known method, the larger sensor electrodes may cause errors in detecting the position of the operation body.

Accordingly, the present discloser has been made to reduce such detection errors in coordinate input devices provided with larger electrodes for increased detection sensitivity.

SUMMARY OF THE INVENTION

A coordinate input device according to an aspect of the disclosure includes an insulating substrate, sensor electrodes having a plurality of detection points, the sensor electrodes being disposed on the insulating substrate, a top panel having an operation surface operable by using an operation body, the top panel covering the sensor electrodes, a measurement circuit configured to measure a capacitance at each of the plurality of detection points, and a calculation circuit configured to calculate a position of the operation body in two-axis directions on the operation surface based on the measured values of the capacitance at the plurality of detection points. The calculation circuit, for each of three or more measured values including the maximum value of the plurality of measured values obtained at the plurality of detection points, corrects the measured value and calculates a first corrected measured value smaller than the measured value, calculates the first corrected measured values such that the differences between the measured values and the first corrected measured values increase nonlinearly as the measured values increase, or calculates the first corrected measured values such that the differences between the measured values and the first corrected measured values increase nonlinearly or linearly when the measured values become greater than or equal to a predetermined value, and calculates the position of the operation body in the two-axis directions on the operation surface using the first corrected measured value corresponding to the maximum value and the first corrected measured values corresponding to the measured values adjacent to the maximum value in one of the two-axis directions.

In coordinate input devices provided with larger electrodes for increased detection sensitivity, a coordinate input device with reduced detection errors can be provided.

BRIEF DESCRIPTION OF THE DRAWINGS

FIG. 7A is a flowchart illustrating an example of processing to be performed by a calculation unit to calculate the position of a fingertip;

DESCRIPTION OF THE PREFERRED EMBODIMENTS

Hereinafter, a coordinate input device according to an embodiment of the disclosure will be described.

Embodiment

Figure 1:
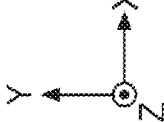
FIG. 1 is a diagram of an example structure of a coordinate input device according to an embodiment.
Figure 2:
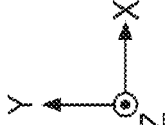
FIG. 2 is a diagram of an example structure of a coordinate input device according to an embodiment.
Figure 3:
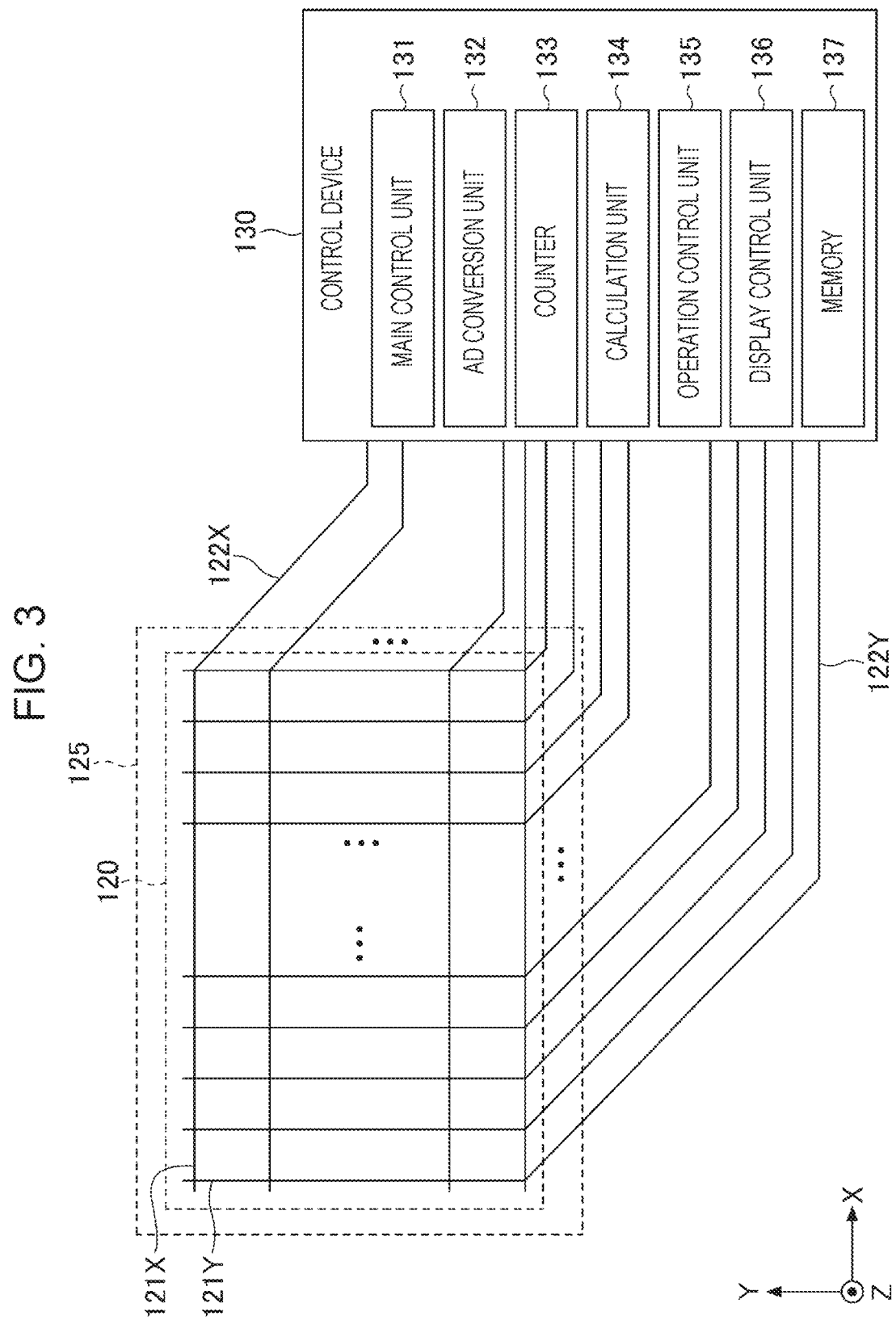
FIG. 3 illustrates an example structure of an electrostatic sensor and a control device in a coordinate input device.

FIG. 1 and FIG. 2 are diagrams of example structures of a coordinate input device 100 according to the embodiment. FIG. 1 illustrates the coordinate input device 100 that is in an operating state, and a display device 110 that is displaying an input image. When the display device 110 is displaying the input image, the coordinate input device 100 is in an input mode. The input mode is a mode in which an operation input can be made to the coordinate input device 100. The coordinate input device 100 in FIG. 2 is in a standby state, and the display device 110 is displaying a standby image. When the display device 110 is displaying the standby image, the coordinate input device 100 is in a power saving mode. In the standby state, the display device 110 is displayed generally in gray and consumes less power. FIG. 3 is a diagram of example structures of an electrostatic sensor 120 and a control device 130 in the coordinate input device 100. The display device 110 is an example of a display section, the electrostatic sensor 120 is an example of a detection section, and the control device 130 is an example of a control section.

In the following description, an XYZ coordinate system is defined and described. A direction (X direction) parallel to the X axis, a direction (Y direction) parallel to the Y axis, and a direction (Z direction) parallel to the Z axis are mutually orthogonal to each other. In addition, in the following description, a −Z direction denotes a direction toward the electrostatic sensor 120, and a +Z direction denotes a direction away from the electrostatic sensor 120. A phrase "in plan view" refers to viewing the XY plane. In the description below, for easy understanding of the structure, the length, width, thickness, and the like of each component may be exaggerated.

The coordinate input device 100 may be, for example, a tablet-type input device or an input unit of an automatic teller machine (ATM), which are placed in stores or facilities and used by the general public. Alternatively, the coordinate input device 100 may be an input section of a cooking appliance that is to be kept clean. Alternatively, the coordinate input device 100 may be a tablet computer, a smart phone, a game machine, or the like for personal use.

<Overall Structure of Coordinate Input Device 100>

The coordinate input device 100 includes a housing 101, a top panel 105, the display device 110, the electrostatic sensor 120, and the control device 130. Although the control device 130 (see FIG. 3) is omitted in FIG. 1 and FIG. 2, the control device 130 is disposed, for example, below the display device 110 and the electrostatic sensor 120 in the housing 101. The coordinate input device 100 includes the electrostatic sensor 120 and the control device 130 illustrated in FIG. 3.

<Housing 101 and Top Panel 105>

The housing 101 is a case made of resin, metal, or the like and is used to accommodate the display device 110, the electrostatic sensor 120, and the control device 130. The display device 110 is disposed, for example, below the transparent electrostatic sensor 120 and is visible through an operation surface 105A, which is a top surface of the transparent top panel 105 that is disposed in an opening portion provided at a top portion of the housing 101.

<Operation Methods of Coordinate Input Device 100>

The coordinate input device 100 can be operated either in a non-contact state in which an operation body such as a hand of the user is not in contact with the operation surface 105A or in a contact state in which an operation body such as a hand of the user is in contact with the operation surface 105A.

Operation methods for the coordinate input device 100 include four methods: a proximity operation, a selection operation, a confirmation operation, and a contact operation. In the four operation methods, the proximity operation, the selection operation, and the confirmation operation are performed in a non-contact state by an operation body such as a hand to the operation surface 105A. The contact operation is performed in a state in which an operation body such as a hand is in contact with the operation surface 105A.

The coordinate input device 100 distinguishes five states of the distance between an operation body such as a hand and the operation surface 105A to determine the four operation methods. These five distance states include an undetected state, a proximity state, a selection state, a confirmation state, and a contact state. The five distance states includes a contact state in which an operation body such as a hand is in contact with the operation surface 105A and a non-contact state in which an operation body such as a hand is not in contact with the operation surface 105A. The undetected state, proximity state, selection state, and confirmation state are the non-contact states.

The undetected state refers to a state in which no proximity operation, selection operation, confirmation operation, or contact operation is being performed. The proximity state, the selection state, the confirmation state, and the contact state refer to states in which the proximity operation, the selection operation, the confirmation operation, and the contact operation are being performed respectively. The coordinate input device 100 uses a plurality of electrostatic capacitance threshold values to determine the operation methods. As the states change from the contact state through the confirmation state, the selection state, the proximity state, to the undetected state, the positions of an operation body such as a hand move away from the operation surface 105A.

The coordinate input device 100 is an input device that is operated by the user by performing a pointing operation. The pointing operation is an operation performed by standing a finger approximately vertically to the operation surface 105A. The number of fingers used in the pointing operation may be more than one, but it is preferable to use one finger.

In performing such a pointing operation, when the finger is not approximately vertical to the operation surface 105A, the entire palm approaches the operation surface 105A and the distribution of the capacitance detected by the coordinate input device 100 changes greatly. Accordingly, the coordinate input device 100 determines whether a pointing operation is performed appropriately.

In the following description, an operation method in which a pointing operation is performed inappropriately, typically performed with the entire palm, is referred to as a non-pointing operation. The coordinate input device 100 determines whether a user's operation is a pointing operation or a non-pointing operation based on the distribution of capacitance. When the operation is a non-pointing operation, the calculation of the position of a fingertip FT may be omitted and a warning indicating that the operation is a non-pointing operation may be displayed. Alternatively, the calculation of the position of a fingertip FT may be performed and a warning indicating that the operation is a non-pointing operation may be displayed.

In the following description, the user performs an operation with a hand H as an example operation body. In addition, in the following description, performing, with the hand H, a proximity operation, a selection operation, a confirmation operation, or a contact operation is simply referred to as performing an operation (proximity operation, selection operation, confirmation operation, or contact operation) with the hand H.

The proximity operation refers to an operation of moving the hand H toward the operation surface 105A of the coordinate input device 100 without touching the operation surface 105A, and is an operation to switch the coordinate input device 100 from the standby state illustrated in FIG. 2 to the operating state illustrated in FIG. 1.

The selection operation refers to an operation of further moving the hand H toward the operation surface 105A of the coordinate input device 100 from the state in which the proximity operation is performed without touching the operation surface 105A to select a graphic user interface (GUI) button displayed on the display device 110.

The confirmation operation refers to an operation of further moving the hand H toward the operation surface 105A of the coordinate input device 100 from the state in which the selection operation is performed without touching the operation surface 105A to fix the operation input to the selected GUI button. The confirmation operation refers to an operation of performing a non-contact operation input, and is an operation to operate the coordinate input device 100 in a non-contact manner without touching the operation surface 105A with the hand H. An operation input performed by the selection operation and the confirmation operation in a non-contact manner may also be referred to as hover input or touchless input.

The contact operation refers to an operation of further moving the hand H toward the operation surface 105A of the coordinate input device 100 from the state in which the selection operation is performed to touch the operation surface 105A to fix the operation input to the selected GUI button. The contact operation may be referred to as a touch input.

<Display Device 110>

The display device 110 is, for example, a liquid crystal display, an organic electro luminescence (EL) display, or the like. The display device 110 is a display for implementing a GUI. The display device 110 displays images of GUI buttons 111, a cursor, and an image of an input content display section 115 that displays an input content. The GUI buttons 111 are an example of an operation section, and are arranged, for example, in a matrix state in plan view. Each of the GUI buttons 111 is, for example, round in shape to resemble a push button.

FIG. 1 to FIG. 3 illustrate, as an example, a total of 45 GUI buttons 111 including 26 alphabet GUI buttons 111, 15 GUI buttons 111 in a form of a numeric keypad, and 4 GUI buttons 111 including a Menu key (key with three lines in the top left), a Caps Lock key, a Backspace key (top right), and an Enter key (bottom right). The 45 GUI buttons 111 are arranged in 5 columns in the Y direction and 11 rows in the X direction. The rows extend in the X direction and the columns extend in the Y direction. Note that the GUI buttons 111 are not limited to the alphabetical characters, numerals for the numeric keypad, or the like, but may be characters, symbols, or the like in other languages.

Here, the example of a total of 45 GUI buttons 111 displayed by the display device 110 will be described. However, the coordinate input device 100 may include the top panel 105 having an operation unit on which alphabetical characters, numerals, symbols, or the like are printed, instead of all or at least some of the 45 GUI buttons 111. For example, a backlight may be disposed on the back side of the top panel 105 such that light can pass through the operation unit on which alphabetical characters, numerals, symbols, or the like are printed. When the coordinate input device 100 is in the standby state, the backlight may be turned off, and when the coordinate input device 100 is switched to the input mode, the backlight may be turned on to illuminate the alphabetical characters, numerals, symbols, or the like printed on the operation unit of the top panel 105. In such a case, to display an input content, a liquid crystal display, an organic EL display, or the like may be provided to only the portion of the input content display section 115.

<Electrostatic Sensor 120>

The electrostatic sensor 120 is disposed on the display device 110 and includes a plurality of sensor electrodes 121X extending in the X direction and a plurality of sensor electrodes 121Y extending in the Y direction as illustrated in FIG. 3. The sensor electrodes 121X and 121Y are an example of electrodes in the detection section, and are connected to the control device 130 via wires 122X and 122Y respectively. The sensor electrodes 121X and 121Y are formed on an insulating substrate 125. Such an electrostatic sensor 120 may be made by forming a transparent conductive film such as an indium tin oxide (ITO) film on the surface of a transparent glass substrate and by patterning the film as the sensor electrodes 121X and 121Y and the wires 122X and 122Y. The capacitance detected by the electrostatic sensor 120 is input to the control device 130. The capacitance detected by the electrostatic sensor 120 is an example of a detection result of the electrostatic sensor 120.

FIG. 3 illustrates, as an example, a plurality of sensor electrodes 121X and a plurality of sensor electrodes 121Y. The distance between the sensor electrodes 121X and the distance between the sensor electrodes 121Y are approximately equal to an average width (approximately 10 mm) of human fingertips, and are approximately equal to the distance between the GUI buttons 111.

The plurality of sensor electrodes 121X are scanned by one row at a time, and the plurality of sensor electrodes 121Y are scanned by one column at a time. An analog-to-digital (AD) conversion unit 132 converts the capacitance at a plurality of intersections of the plurality of sensor electrodes 121X and the plurality of sensor electrodes 121Y into digital values. A counter 133 counts a change in the output of the AD conversion unit 132 and outputs a difference value ΔAD at each intersection. Each intersection is an example detection point. It should be noted that the GUI buttons 111 and sensor electrodes of approximately the same size as the GUI buttons 111 may be provided in a one-to-one correspondence.

The position of the hand H represented by XY coordinates detected by the coordinate input device 100 by using the electrostatic sensor 120 is, for example, XY coordinates at which the capacitance is largest in the region in which the hand His present. The position of the hand H in the Z direction detected by the coordinate input device 100 by using the electrostatic sensor 120 is inversely proportional to the capacitance detected by the electrostatic sensor 120, and thus determining the position of the hand H in the Z direction is equivalent to determining the capacitance between the hand H and the electrostatic sensor 120. The coordinate input device 100, for example, determines the position of the hand H in the Z direction based on the capacitance between the hand H and the electrostatic sensor 120; however, in the following description, when it is easier to understand to describe as the position of the hand H in the Z direction, it is described as the position of the hand H in the Z direction.

<Control Device 130>

The control device 130 is implemented by a computer including a central processing unit (CPU), random access memory (RAM), read-only memory (ROM), an input-output interface, an internal bus, and the like.

The control device 130 includes a main control unit 131, the AD conversion unit 132, the counter 133, a calculation unit 134, an operation control unit 135, a display control unit 136, and memory 137. The AD conversion unit 132 and the counter 133 are an example measurement circuit. The calculation unit 134 is an example calculation circuit. The main control unit 131, the AD conversion unit 132, the counter 133, the calculation unit 134, the operation control unit 135, and the display control unit 136 represent functions of a program to be implemented by the control device 130 as function blocks. The memory 137 represents the function of the memory of the control device 130.

The main control unit 131 is a processing unit that performs overall control of the processing in the control device 130, and executes processing other than the processing performed by the AD conversion unit 132, the counter 133, the calculation unit 134, the operation control unit 135, and the display control unit 136. For example, the main control unit 131 scans the plurality of sensor electrodes 121X and the plurality of sensor electrodes 121Y.

The AD conversion unit 132 converts an output of the electrostatic sensor 120 into a digital value. The output of the AD conversion unit 132 is a detection value of the capacitance at each of the intersections of the sensor electrodes 121X and 121Y in the electrostatic sensor 120. The counter 133 counts and outputs the difference value of an output of the AD conversion unit 132 with respect to a reference value. The difference value is a count value of a change in the output with respect to the reference value. Hereinafter, the difference value is referred to as a difference value $\Delta$AD. The reference value is the capacitance at each of the intersections of the sensor electrodes 121X and 121Y when no finger is present around the sensor electrodes 121X and 121Y. The difference value $\Delta$AD is the capacitance between each of the intersections of the sensor electrodes 121X and 121Y and a finger.

The difference value $\Delta$AD can be obtained for each intersection. The AD conversion unit 132 converts the capacitance at each of the intersections of the sensor electrodes 121X and 121Y into a digital value. The counter 133 counts a change in an output of the AD conversion unit 132 with respect to a reference value and outputs a difference value $\Delta$AD for each intersection.

The calculation unit 134 determines, based on a difference value $\Delta$AD output from the counter 133, a position of the hand H in the XY coordinates and a position of the hand H from the operation surface 105A in the Z direction. The difference value $\Delta$AD output from the counter 133 is an example of a measured value of the capacitance at each of the intersections of the sensor electrodes 121X and 121Y in the electrostatic sensor 120.

The calculation unit 134 determines a distance state between the hand H and the operation surface 105A by using a plurality of threshold values for determining an undetected state, a proximity operation, a selection operation, a confirmation operation, and a contact operation. The plurality of threshold values are a total of eight threshold values including an ON threshold value and an OFF threshold value for providing hysteresis properties for determining each operation of an undetected state, a proximity operation, a selection operation, a confirmation operation, and a contact operation. As described above, the distance states between the hand H and the operation surface 105A include the undetected state, the proximity state, the selection state, the confirmation state, and the contact state. The calculation unit 134 determines the position of the hand H in each state and outputs data that represents the determined position of the hand H to the operation control unit 135.

The calculation unit 134 does not correct the measured value of capacitance when a proximity operation, a selection operation, or a confirmation operation is being performed. This is because the measured value of capacitance when a proximity operation, a selection operation, or a confirmation operation is being performed is generally proportional to the area of the finger, due to reasons described below.

The calculation unit 134 corrects the measured value of capacitance when a contact operation is being performed. This is because the measured value of capacitance when a contact operation is being performed is not proportional to the area of the finger, due to reasons described below. The calculation unit 134 performs such correction and thereby the detection accuracy of the position of the hand H in performing a contact operation can be increased.

The operation control unit 135 controls the operation of the coordinate input device 100 based on the position of the hand H determined by the calculation unit 134. The display control unit 136 controls the display of the display device 110 based on the position of the hand H determined by the calculation unit 134. The memory 137 stores programs, data, and the like to be used when the main control unit 131, the calculation unit 134, the operation control unit 135, and the display control unit 136 execute processing.

<Operation to Operation Surface 105A>

Figure 4:
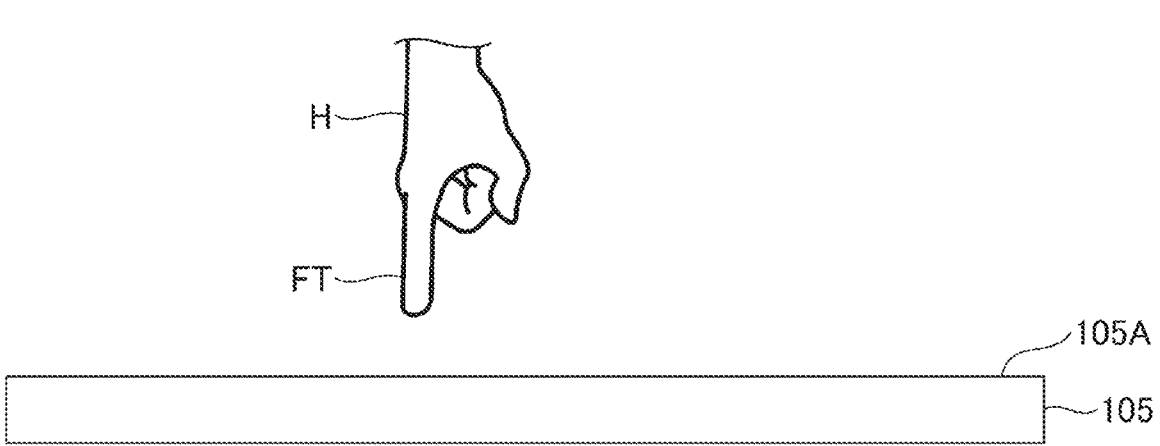
FIG. 4 is a diagram of an example state in which an operation is performed with a fingertip of a hand to an operation surface of a coordinate input device.

FIG. 4 is a diagram of an example state in which an operation is being performed with the fingertip FT of the hand H to the operation surface 105A of the coordinate input device 100. FIG. 4 illustrates a state in which a pointing operation is being performed by moving the fingertip FT of the hand H vertically toward the operation surface 105A of the top panel 105. As described above, it is preferable that such an operation method of moving the fingertip FT vertically toward the operation surface 105A of the top panel 105 be performed.

The coordinate input device 100 can distinguish between the proximity operation, the selection operation, the confirmation operation, and the contact operation by using the above-described plurality of threshold values. As operations change from the proximity operation, the selection operation, the confirmation operation, to the contact operation, the fingertip FT comes closer to the operation surface 105A. Accordingly, by increasing the threshold values from the proximity operation to the contact operation, it is possible to distinguish between the proximity operation, the selection operation, the confirmation operation, and the contact operation. In the following description, how to increase position detection accuracy in contact operations will be described.

<Measured Value Correction>

Here, the correction of measured values of capacitance when a contact operation is being performed will be described. A measured value of capacitance corresponds to a difference value $\Delta$AD. In addition, the arrangement of the sensor electrodes 121X in the Y direction and the arrangement of the sensor electrodes 121Y in the X direction are similar. Accordingly, here, although the description will be made by referring to the sensor electrodes 121X, the same applies to the sensor electrodes 121Y.

When the measurement sensitivity of the coordinate input device 100 is increased, the sensor electrodes 121X are influenced not only by the portion of the fingertip FT directly above the sensor electrodes 121X but also by a portion of the fingertip FT diagonally above the sensor electrodes 121X. In particular, when the distance between the sensor electrodes 121X is approximately equal to the width of the fingertip FT, the sensor electrode 121X under the central portion of the fingertip FT in the Y-direction width measures the capacitance produced between the portion of the fingertip FT that is larger than the width of the sensor electrode 121X in the Y direction.

In contrast, the sensor electrodes 121X under the edge of the fingertip FT in the Y-direction width do not measure the capacitance in a region outside the edge of the fingertip FT in the Y-direction width.

Accordingly, the capacitance measured by respective sensor electrodes 121X is not proportional to the area of the fingertip FT that faces the respective sensor electrodes 121X. This is because the sensor electrode 121X under the central portion of the fingertip FT in the Y-direction width detects a large measured value whereas the sensor electrodes 121X under the edge of the fingertip FT in the Y-direction width detect small measured values.

Accordingly, the coordinate input device 100 corrects the measured values to become smaller when the measured values are large, and thereby corrected measured values (first corrected measured values) that are approximately proportional to the area of the fingertip FT that faces the respective sensor electrodes 121X can be obtained. More specifically, as the measured values become larger, the coordinate input device 100 increases the ratio at which the correction values are reduced when correcting the measured values. By correcting the measured values in this way, the coordinate input device 100 can obtain corrected measured values (first corrected measured values) that are approximately proportional to the area of the fingertip FT that faces the respective sensor electrodes 121X. In addition, by obtaining corrected measured values (first corrected measured values) that are approximately proportional to the area of the fingertip FT that faces the respective sensor electrodes 121X, the detection accuracy of the position of the hand H (position of the fingertip FT) in the Y direction can be increased. In addition, also in the X direction, the detection accuracy can be increased similarly by using the sensor electrodes 121Y, and thus the detection accuracy of the position of the hand H (position of the fingertip FT) in the X direction and Y direction can be increased by using the sensor electrodes 121X and 121Y.

In contrast, when the fingertip FT is away from the operation surface 105A by a certain distance, the measured values also become larger at sensor electrodes 121X directly under the edge of the fingertip FT in the Y-direction width. Accordingly, when the fingertip FT is away from the operation surface 105A by a certain distance, the measured values of the sensor electrodes 121X directly under the edge of the fingertip FT in the Y-direction width and the measured value of the sensor electrode 121X directly under the central portion of the fingertip FT in the Y-direction width are in a relationship that is approximately proportional to the area of the fingertip FT that faces the sensor electrodes 121X.

As a result, when the fingertip FT is away from the operation surface 105A by a certain distance, good detection accuracy of the position of the fingertip FT can be obtained without correcting the measured values as described above. When the fingertip FT is away from the operation surface 105A by a certain distance, it corresponds to performing a proximity operation, a selection operation, or a confirmation operation.

For these reasons described above, when a contact operation is being performed, as measured values become larger, the coordinate input device 100 increases the ratio at which correction values are reduced when correcting the measured values. When a proximity operation, a selection operation, or a confirmation operation is being performed, the coordinate input device 100 does not correct the measured values. The proximity operation, the selection operation, or the confirmation operation, or the contact operation can be determined by determining whether measured values (difference values ΔAD) are greater than or equal to a contact threshold value for determining that a contact operation has been performed.

<Measured Value and First Corrected Measured Value>

Figure 5:
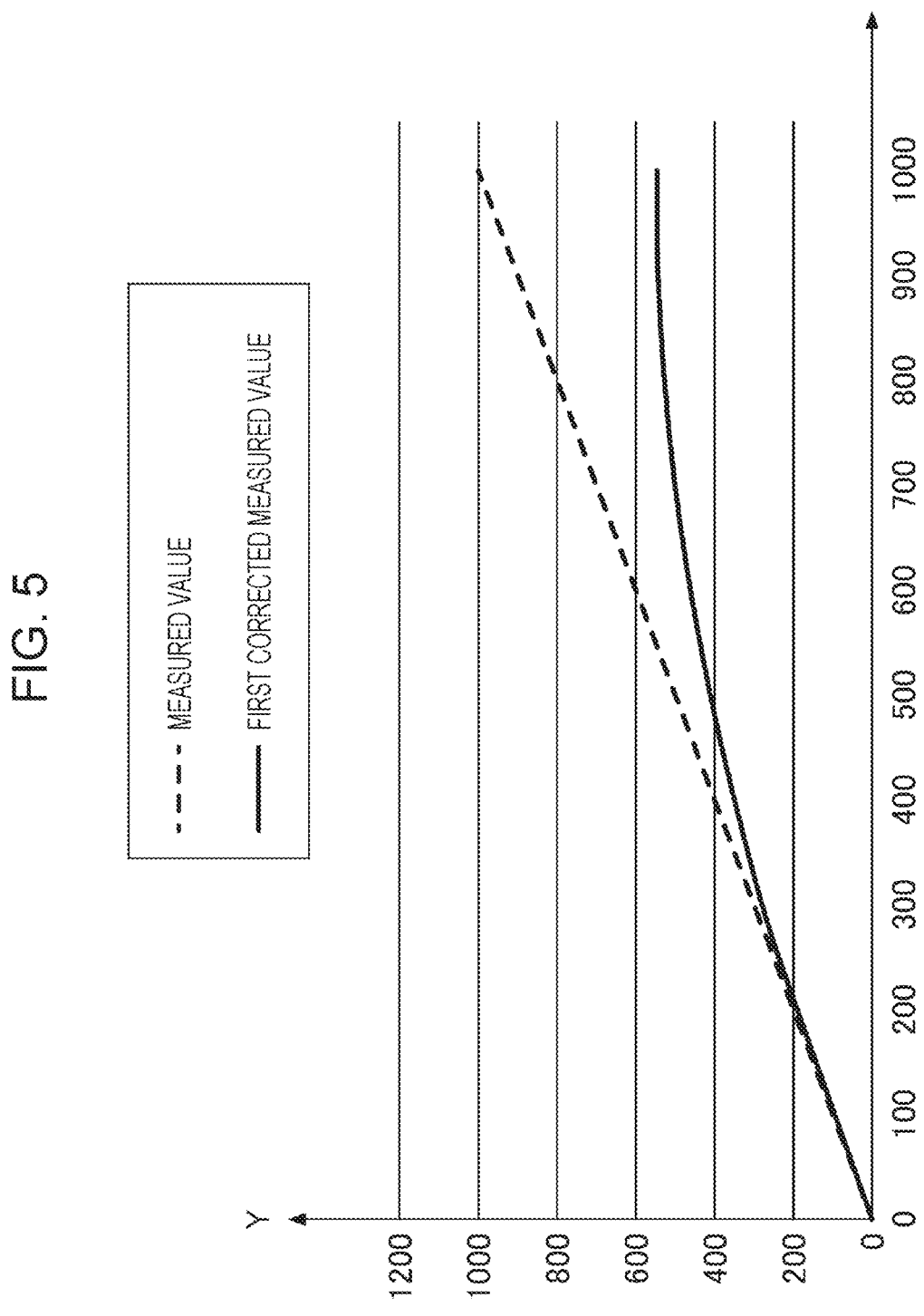
FIG. 5 is a diagram of an example relationship between measured values and first corrected measured values.

FIG. 5 is a diagram of an example relationship between measured values and first corrected measured values. In FIG. 5, the horizontal axis X denotes measured values (difference values ΔAD) as count values. The vertical axis Y denotes measured values (difference values ΔAD) without correction and first corrected measured values that are corrected values of the measured values (difference values ΔAD) as count values. The characteristics of the measured values without correction are shown by the broken line and the first corrected measured values are shown by the solid line.

The characteristics (broken line) of the measured values without correction are that the measured values without correction have equal values on the horizontal axis X and the vertical axis Y, and are represented by Y=X. In contrast, the characteristics (solid line) of the first corrected measured values show a nonlinear increase in the difference from the measured values shown by the broken line as the values of the measured values on the horizontal axis X increase.

Here, a first corrected measured value Y can be expressed by the following equation (1):

$$Y = K1 \times X \times (K2 - X/Cmax) \tag{1}$$

where the maximum value of the measured values (difference values ΔAD) calculated based on the capacitance measured at all intersections of the plurality of sensor electrodes 121X and 121Y is Cmax, the first corrected measured value is Y, and the measured value is X. Note that it is preferable that K1 be a constant less than 1, and that K2 be a value in the range of 1.7 to 2.3, and most preferably 2.

Equation (1) is a quadratic function that can be expressed in the form Y=−A(X+B)2+C. Here, A is a positive value, and A, B, and C are constants that satisfy Equation (1).

As described above, the characteristics of the first corrected measured values (solid line) can be expressed as a quadratic function that passes through the origin, opens downward, and lies below the line Y=X in the coordinate plane with the X axis and the Y axis. The first corrected measured values can be obtained by using such a quadratic function. The quadratic function is a continuously differentiable function.

As the values of the measured values increase, the differences between such first corrected measured values and the measured values represented by the broken line increase. Accordingly, by using the first corrected measured values, the capacitance measured at each intersection of the sensor electrodes 121X and 121Y can be corrected from the relationship that the capacitance is not proportional to the area of the fingertip FT that is facing the sensor electrodes 121X and 121Y to become closer to the relationship that the capacitance is proportional to the area of the fingertip FT that is facing the sensor electrodes 121X and 121Y. By optimizing the values of the constant K and the constants A, B, and C, it is possible to obtain corrected measured values (first corrected measured values) that are approximately proportional to the area of the fingertip FT facing sensor electrodes 121X and 121Y when a contact operation is being performed.

It should be noted that the quadratic function may be a quadratic function that provides a downward opening parabola obtained using a quadratic function like the above-described quadratic function and has a vertex that is a first corrected measured value that corresponds to the maximum value of measured values (difference values ΔAD) calculated based on the capacitance measured at all intersections.

<Calculation of Position of Fingertip FT>

The coordinate input device 100 calculates the position of the fingertip FT, using three or more first corrected measured values including the maximum value of a plurality of first corrected measured values that correspond to a plurality of measured values obtained at a plurality of intersections of the sensor electrodes 121X and 121Y, by using the maximum value and the first corrected measured values that are adjacent to the maximum value in the X direction or the Y direction. The position of the fingertip FT is the position of the fingertip FT in the operation surface 105A in the two-axis directions.

More specifically, as an example, the position of the fingertip FT can be calculated using a curve approximation method or a centroid calculation method. Such curve approximation method and centroid calculation method are described in Japanese Unexamined Patent Application Publication No. 2013-003978, which is cited as Patent Literature 1, and will be briefly described below.

<Curve Approximation Method>

Figure 6A:
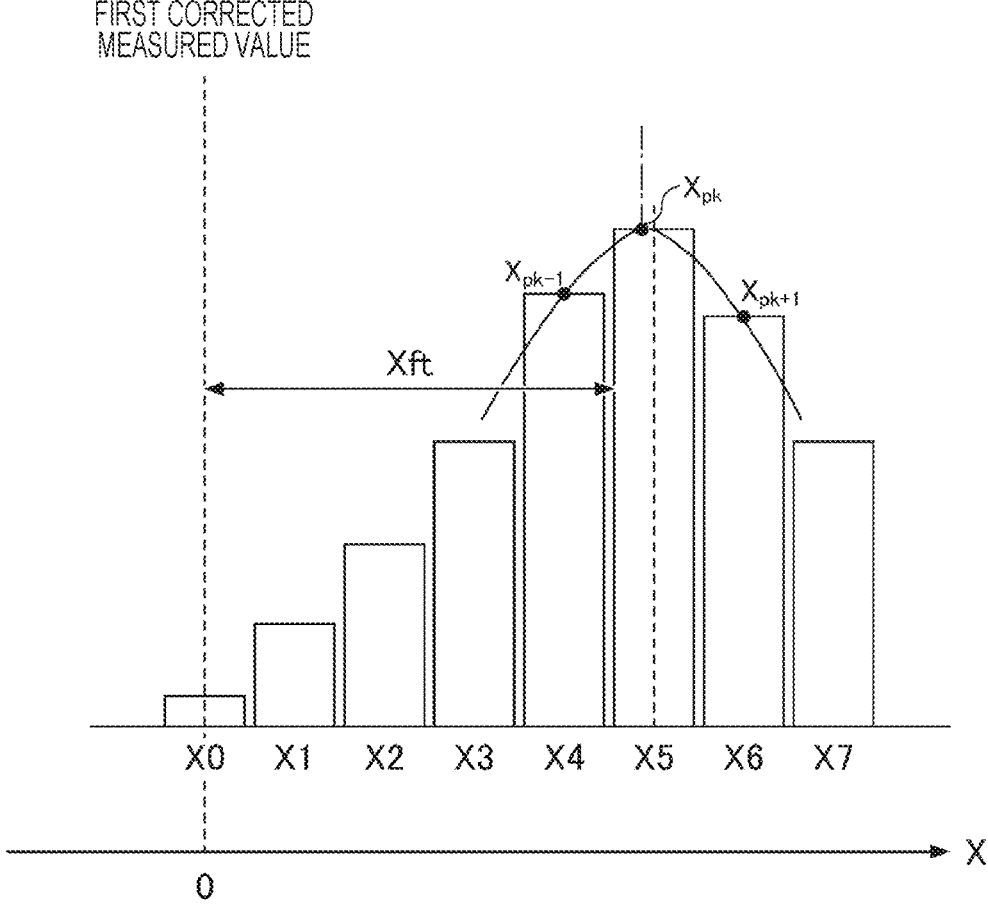
FIG. 6A is a diagram illustrating an example curve approximation method.

FIG. 6A is a diagram illustrating an example curve approximation method. FIG. 6A shows, as an example, first corrected measured values that are corrected values of measured values (difference values ΔAD) obtained at eight intersections arranged in the X direction. These eight intersections are denoted as X0 to X7 to distinguish them, and are referred to as intersections X0 to X7 here. The X-coordinate of the intersection X0 is zero. In FIG. 6A, as an example, the first corrected measured value of the intersection X5 is the maximum value (peak value).

The calculation unit 134 calculates first corrected measured values for the intersection X5, at which the maximum measured value is obtained, and for the intersections X4 and X6 adjacent to the intersection X5, and performs the curve approximation method by using the change in the first corrected measured values.

For example, the calculation unit 134 calculates an X-coordinate Xft, which is an X-coordinate of the position of the fingertip FT, based on the three first corrected measured values obtained based on the three measured values of the intersection X5 and two intersections X4 and X6 that are adjacent to the intersection X5 in the X direction, by using the quadratic curve approximation method using the following equation (2):

$$Xft = \frac{C_{pk-1} - C_{pk+1}}{(C_{pk-1} + C_{pk+1} - 2 \times C_{pk}) \times 2} \times RES + Xmax \qquad (2)$$

where the first corrected measured value of the intersection (Xpk, Ypk) where the maximum measured value is obtained is denoted as Cpk, the first corrected measured value of the intersection (Xpk−1, Ypk) located adjacent to the intersection (Xpk, Ypk) in the −X direction is denoted as Cpk−1, and the first corrected measured value of the intersection (Xpk+1, Ypk) located adjacent to the intersection (Xpk, Ypk) in the +X direction is denoted as Cpk+1. In addition, the resolution, which is the interval between sensor electrodes 121X and 121Y with respect to the unit coordinates, is denoted as RES, and the X-coordinate of the intersection where the maximum value Cmax of the measured values (difference values ΔAD) is obtained is denoted as Xmax.

It should be noted that, instead of the first corrected measured value Cpk−1, the first corrected measured value of the intersection (Xpk−2, Ypk) located adjacent to the intersection (Xpk−1, Ypk) in the −X direction may be used. In addition, instead of the first corrected measured value Cpk+1, the first corrected measured value of the intersection (Xpk+2, Ypk) located adjacent to the intersection (Xpk+1, Ypk) in the +X direction may be used. These first corrected measured values are the first corrected measured values that correspond to the three or more measured values including the maximum value of the plurality of measured values.

In addition, by performing similar processing for the plurality of intersections arranged in the Y direction, a Y-coordinate Yft, which is a Y-coordinate of the position of the fingertip FT, can be calculated. The position of the fingertip FT is expressed by using XY coordinates (Xft, Yft).

<Centroid Calculation Method>

Figure 6B:
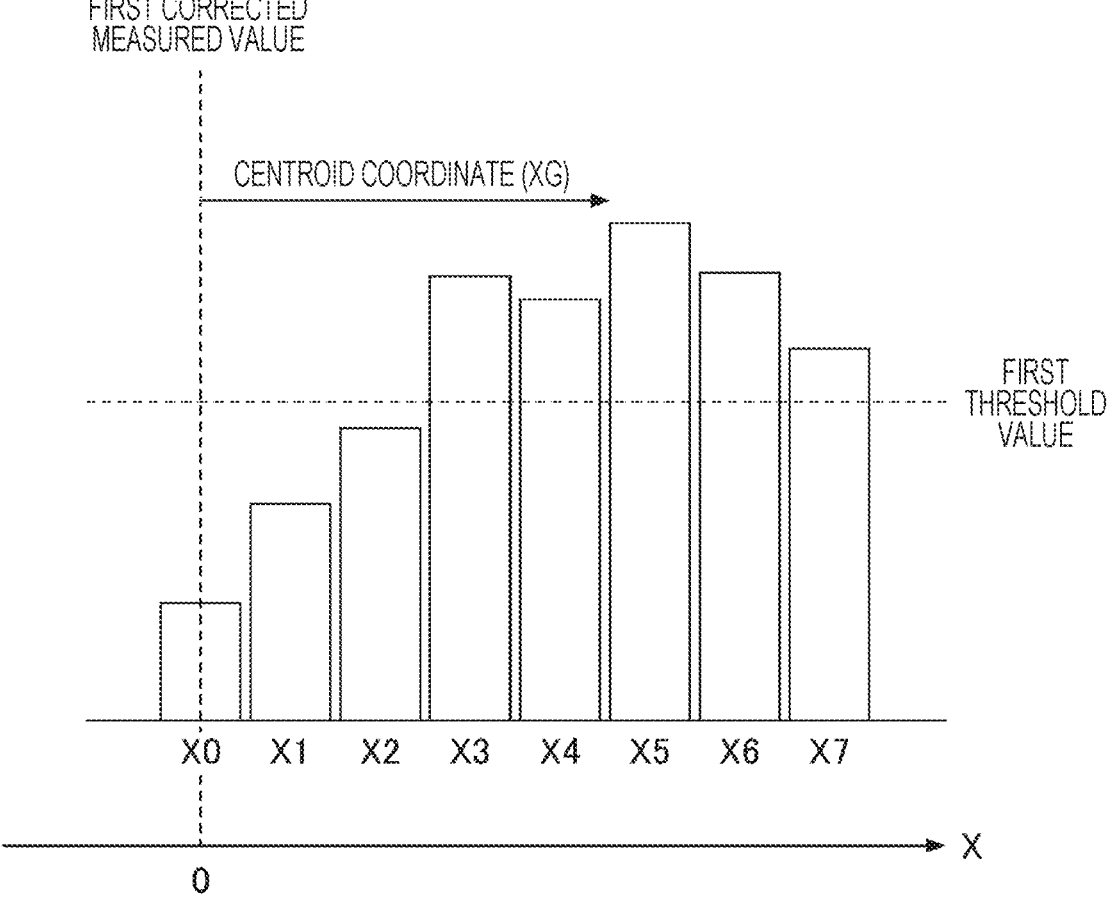
FIG. 6B is a diagram illustrating an example centroid calculation method.

FIG. 6B is a diagram illustrating an example centroid calculation method. FIG. 6B shows, similarly to FIG. 6A, first corrected measured values that are corrected values of measured values (difference values ΔAD) obtained at eight intersections arranged in the X direction, as an example. These eight intersections are denoted as X0 to X7 to distinguish them, and are referred to as intersections X0 to X7 here. The X-coordinate of the intersection X0 is zero. In FIG. 6B, as an example, the first corrected measured value of the intersection X5 is the maximum value (peak value).

The calculation unit 134 calculates a change between first corrected measured values of adjacent intersections in the X direction for the intersections X0 to X7. Then, the calculation unit 134 performs a centroid calculation method on intersections (intersections X3 to X7 in FIG. 6B) in a region that includes at least intersections at which the changes are greater than or equal to a first threshold value consecutively in the X direction from the intersection X5, at which the maximum value of the first corrected measured values is obtained.

The calculation unit 134 calculates a centroid position XG by weighting the first corrected measured values that are greater than or equal to the first threshold value out of the first corrected measured values of the intersections X3 to X7. The centroid position XG is the X-coordinate of the position of the fingertip FT.

In addition, by performing similar processing to a plurality of intersections arranged in the Y direction to calculate the centroid, the Y-coordinate YG, which is the Y-coordinate of the position of the fingertip FT, can be calculated. The position of the fingertip FT is expressed by using the XY coordinates (XG, YG).

The description above has explained, when a contact operation is performed, the method of calculating the XY coordinates of the fingertip FT by using the curve approximation method or the centroid calculation method by using the first corrected measured values, which are the corrected values of the measured values (difference values ΔAD) obtained at the intersections of the sensor electrodes 121X and 121Y.

However, such a method of calculating the XY coordinates of the Fingertip FT can be used not only for the contact operation but also, for example, for a confirmation operation, a selection operation, or a proximity operation. Compared with contact operations, the measured values (difference values ΔAD) obtained at the intersections of the sensor electrodes 121X and 121Y are small when confirmation operations, selection operations, and proximity operations are performed, and accordingly, it is preferable that the XY coordinates of the fingertip FT be calculated by using the curve approximation method or the centroid calculation method by using second corrected measured values that are values obtained by further correcting the first corrected measured values as described below.

Let C(m) be the measured value obtained at a mth intersection Xm among a plurality of intersections arranged in the X direction, C1(m) be the first corrected measured value obtained by correcting the measured value C(m), and W be the weight. A second corrected measured value C2(m) obtained by weighted averaging using the measured value C(m), the first corrected measured values C1(m), and the weight W can be expressed by the following equation (3):

$$C2(m) = [\{100 - W \times C(m)\} + W \times C1(m)]/100 \qquad (3)$$

Here, the weight W can be expressed by the following equation (4):

$$W = \mathrm{LIMIT}((100 \times Cmax)/Th, 0, 100) \qquad (4)$$

where the contact threshold value for the measured values for determining that a contact operation has been performed is Th, and the maximum value of the measured values obtained at all intersections of the plurality of sensor electrodes 121X and 121Y is Cmax.

Equation (4) can be expressed by a limit function (LIMIT) that limits the weight W to a numerical value of 0 or greater and 100 or less. When a value ((100×Cmax)/Th) obtained by dividing the maximum measured value Cmax by the contact threshold value Th and multiplying it by 100 exceeds 100, the weight is limited to 100.

As described above, when the second corrected measured value C2(m) is calculated, by replacing the above-described first corrected measured value C1(m) with the second corrected measured value C2(m), the XY coordinates of the fingertip FT can be calculated. That is, the first corrected measured value C1(m) in the above-described curve approximation method or the centroid calculation method can be replaced with the second corrected measured value C2(m) to calculate the XY coordinates of the fingertip FT.

For example, when the maximum value of the measured values at all intersections is greater than or equal to the contact threshold value Th, the XY coordinates of the fingertip FT can be calculated by using the curve approximation method or the centroid calculation method by using the first corrected measured value. When the maximum value of the measured values at all intersections is less than the contact threshold value Th, the XY coordinates of the fingertip FT can be calculated by using the curve approximation method or the centroid calculation method by using the second corrected measured value.

It should be noted that Equation (1) for calculating a first corrected measured value can be expressed by the following equation (5) using the measured value C(m) and the first corrected measured value C1(m):

$$C1(m) = K1 \times C(m) \times (K2 - C(m)/Cmax) \qquad (5)$$

where, K1 is a constant less than 1, and K2 is a predetermined constant.

In addition, by removing the Xmax from Equation (2), an equation for calculating an interpolation amount D for interpolating an X-coordinate or a Y-coordinate can be obtained, as shown in Equation (6):

$$D = \frac{C_{pk-1} - C_{pk+1}}{(C_{pk-1} + C_{pk+1} - 2 \times C_{pk}) \times 2} \times RES \qquad (6)$$

<Flowchart>

Figure 7B:
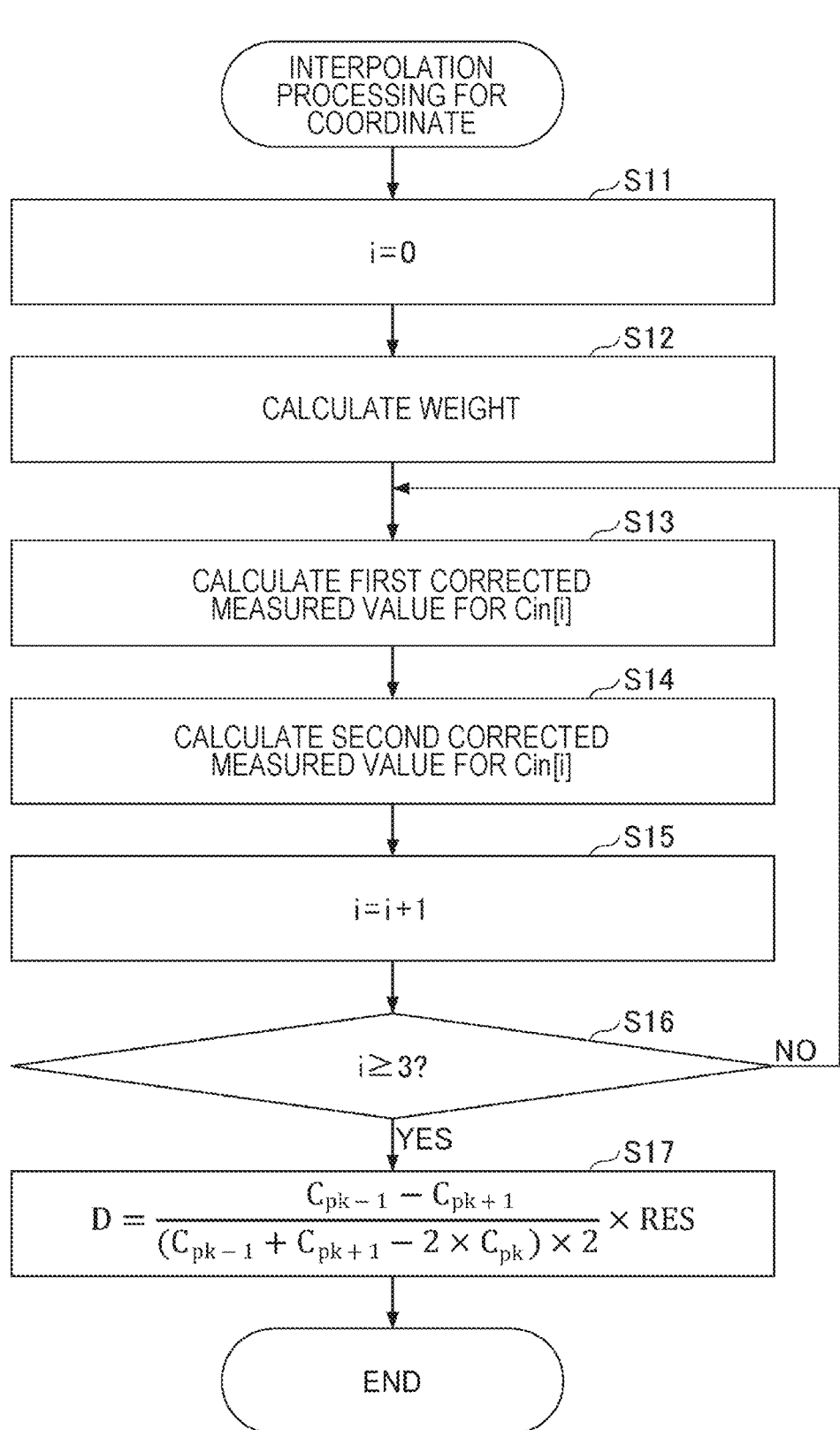
FIG. 7B is a flowchart illustrating an example of interpolation processing for coordinates in steps S4 and S8 in FIG. 7A.

FIG. 7A is a flowchart illustrating an example of processing to be performed by the calculation unit 134 to calculate the position of the fingertip FT. FIG. 7B is a flowchart illustrating an example of interpolation processing for coordinates in steps S4 and S7 in FIG. 7A.

When the calculation unit 134 starts the processing, the calculation unit 134 acquires measured values at respective intersections of the sensor electrodes 121X and 121Y (step S1).

The calculation unit 134 determines an intersection (Xpk, Ypk) at which the maximum measured value of all intersections is obtained (step S2).

The calculation unit 134 substitutes the measured value at the intersection (Xpk−1, Ypk) into Cin[0], substitutes the measured value at the intersection (Xpk, Ypk) into Cin[1], and substitutes the measured value at the intersection (Xpk+1, Ypk) into Cin[2] (step S3). Cin[i] is a region in the memory of the control device 130 where measured values are substituted, and i is an integer that can take a value from 0 to 3.

The intersection (Xpk−1, Ypk) is an intersection that is located adjacent to the intersection (Xpk, Ypk), where the maximum measured value is obtained, in the −X direction, and the intersection (Xpk+1, Ypk) is an intersection that is located adjacent to the intersection (Xpk, Ypk), where the maximum measured value is obtained, in the +X direction.

The calculation unit 134 performs interpolation processing for the X-coordinate (step S4). The process in step S4 is a subroutine process. Here, the interpolation processing in step S4 is described with reference to FIG. 7B.

<Coordinate Interpolation Processing>

Here, the interpolation processing for the X-coordinate as the subroutine process of the process in step S4 is described with reference to FIG. 7B.

The calculation unit 134 sets i to zero (step S11). That is, i=0.

The calculation unit 134 calculates a weight W using Equation (4) (step S12).

The calculation unit 134 calculates a first corrected measured value for Cin[i] using Equation (5) (step S13).

The calculation unit 134 calculates a second corrected measured value for Cin[i] using Equation (3) (step S14).

The calculation unit 134 increments i (step S15). That is, i=i+1.

The calculation unit 134 determines whether i is three or greater (step S16).

When the calculation unit 134 determines that i is not three or greater (S16: NO), the processing returns to step S13. As a result, the processing in steps S13 to S15 is repeated until it becomes i=3, and first corrected measured values and second corrected measured value are calculated for Cin[0] to Cin[2].

In step S16, when the calculation unit 134 determines that i is three or greater (S16: YES), the calculation unit 134 calculates an interpolation amount D for the X-coordinate using Equation (6) (step S17). In Equation (6), the interpolation amount D can be calculated using the second corrected measured value obtained for Cin[1] as Cpk, the second corrected measured value obtained for Cin[0] as Cpk−1, and the second corrected measured value obtained for Cin[2] as Cpk+1.

It should be noted that the processing in step S14 may be omitted. In such a case, when the interpolation amount D is calculated for the X-coordinate using Equation (6) in step S17, the interpolation amount D can be calculated using the first corrected measured value obtained for Cin[1] as Cpk, the first corrected measured value obtained for Cin[0] as Cpk−1, and the first corrected measured value obtained for Cin[2] as Cpk+1.

The calculation unit 134 calculates the X-coordinate of the fingertip FT (step S5). The calculation unit 134 calculates the X-coordinate of the fingertip FT by adding the interpolation amount D for the X-coordinate obtained in step S17 to the X-coordinate Xmax of the intersection at which the maximum value Cmax of the measured values (difference values ΔAD) is obtained.

The calculation unit 134 then performs a calculation for the Y-coordinate.

The calculation unit 134 substitutes the measured value at the intersection (Xpk, Ypk−1) into Cin[0], substitutes the measured value at the intersection (Xpk, Ypk) into Cin[1], and substitutes the measured value at the intersection (Xpk, Ypk+1) into Cin[2] (step S6).

The intersection (Xpk, Ypk−1) is an intersection that is located adjacent to the intersection (Xpk, Ypk), where the maximum measured value is obtained, in the −Y direction, and the intersection (Xpk, Ypk+1) is an intersection that is located adjacent to the intersection (Xpk, Ypk), where the maximum measured value is obtained, in the +Y direction.

The calculation unit 134 performs interpolation processing for the Y-coordinate (step S7). The process in step S7 is a subroutine process. Similarly to the subroutine processing in step S4, the calculation unit 134 performs the interpolation processing for the Y-coordinate according to the flow in FIG. 7B to calculate an interpolation amount D for the Y-coordinate.

The calculation unit 134 calculates the Y-coordinate of the fingertip FT (step S8). The calculation unit 134 calculates the Y-coordinate of the fingertip FT by adding the interpolation amount D for the Y-coordinate obtained in step S17 to the Y-coordinate Ymax of the intersection where the maximum value Cmax of the measured values (difference values ΔAD) is obtained.

<Simulation Results>

Figure 8:
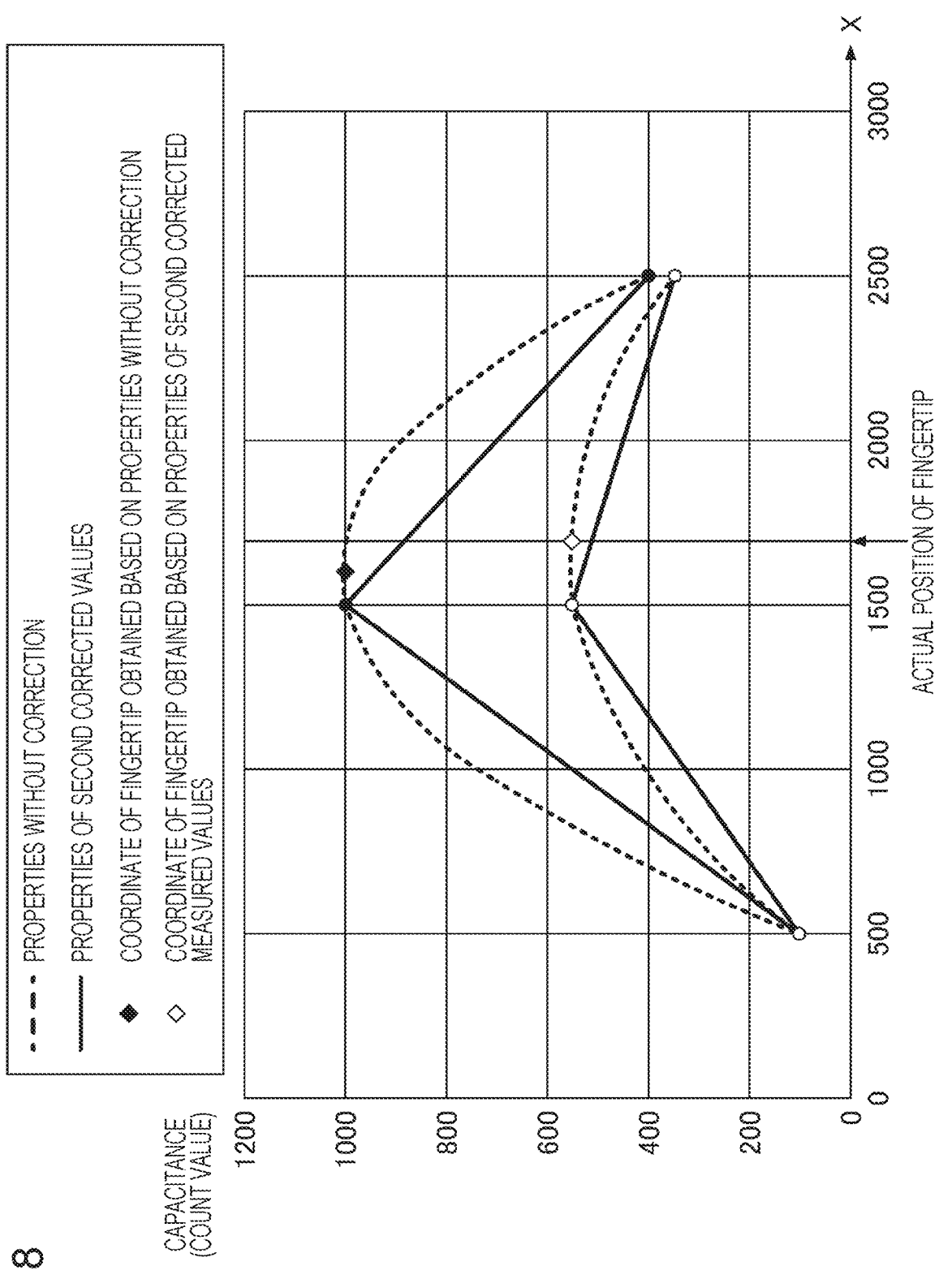
FIG. 8 is a diagram of example simulation results.

FIG. 8 is a diagram of example simulation results. In FIG. 8, the horizontal axis X represents X-coordinates, and the vertical axis represents the capacitance (count values). The intersections of the sensor electrodes 121X and 121Y are located at three points of X-coordinates 500, 1500, and 2500 in FIG. 8. The intersections at the X-coordinate 1500 are intersections at which the maximum measured values were obtained.

In FIG. 8, the characteristics of the lines shown by the solid lines are characteristics obtained by connecting the second corrected measured values obtained at the three intersections. The quadratic curves that fit the characteristics of the lines shown by the solid lines are quadratic curves that are fitted using the curve approximation method to the second corrected measured values obtained at the three intersections. The white diamond (◇) indicates the maximum value of the quadratic curve that is fitted using the curve approximation method to the second corrected measured values obtained at the three intersections. In other words, the X-coordinate of the white diamond (◇) represents the X-coordinate that was shifted by correction from the intersection (intersection of the X-coordinate 1500) at which the maximum measured value was obtained.

The characteristics of the lines shown by the broken lines are characteristics obtained by connecting the measured values obtained at the three intersections. The quadratic curves that fit the characteristics of the lines shown by the broken lines are quadratic curves that are fitted using the curve approximation method to the measured values obtained at the three intersections. The black diamond (◆) indicates the maximum value of the quadratic curve that is fitted using the curve approximation method to the measured values obtained at the three intersections. In other words, the X-coordinate of the black diamond (◆) represents the X-coordinate that was obtained without correction.

As illustrated in FIG. 8, when the measured values were used directly to calculate the coordinate, the calculated X-coordinate of the maximum value was closer to the measured X-coordinate than the correct X-coordinate. When the X-coordinate was calculated by correcting the measured value using the method according to the embodiment of the disclosure, the coordinate closer to the correct X-coordinate was calculated. It should be noted that, although the X-coordinates are shown in FIG. 8, it was confirmed that the same applies to the Y-coordinates.

As the measured values became larger, when the measured values were corrected and the first corrected measured values were calculated, the ratio at which the first corrected measured values were reduced was increased. With this processing, the calculated coordinate was actually brought closer to the coordinate directly under the center of the finger. It is found that by correcting measured values using the method according to the embodiment of the disclosure, it is possible to reduce errors even when the large electrodes are used to achieve high detection sensitivity. It is presumed that by correcting measured values using the method according to the embodiment of the disclosure, the corrected values become closer to values proportional to the area of the fingertip FT that faces the sensor electrodes 121X and 121Y, thereby reducing errors.

Figure 9A:
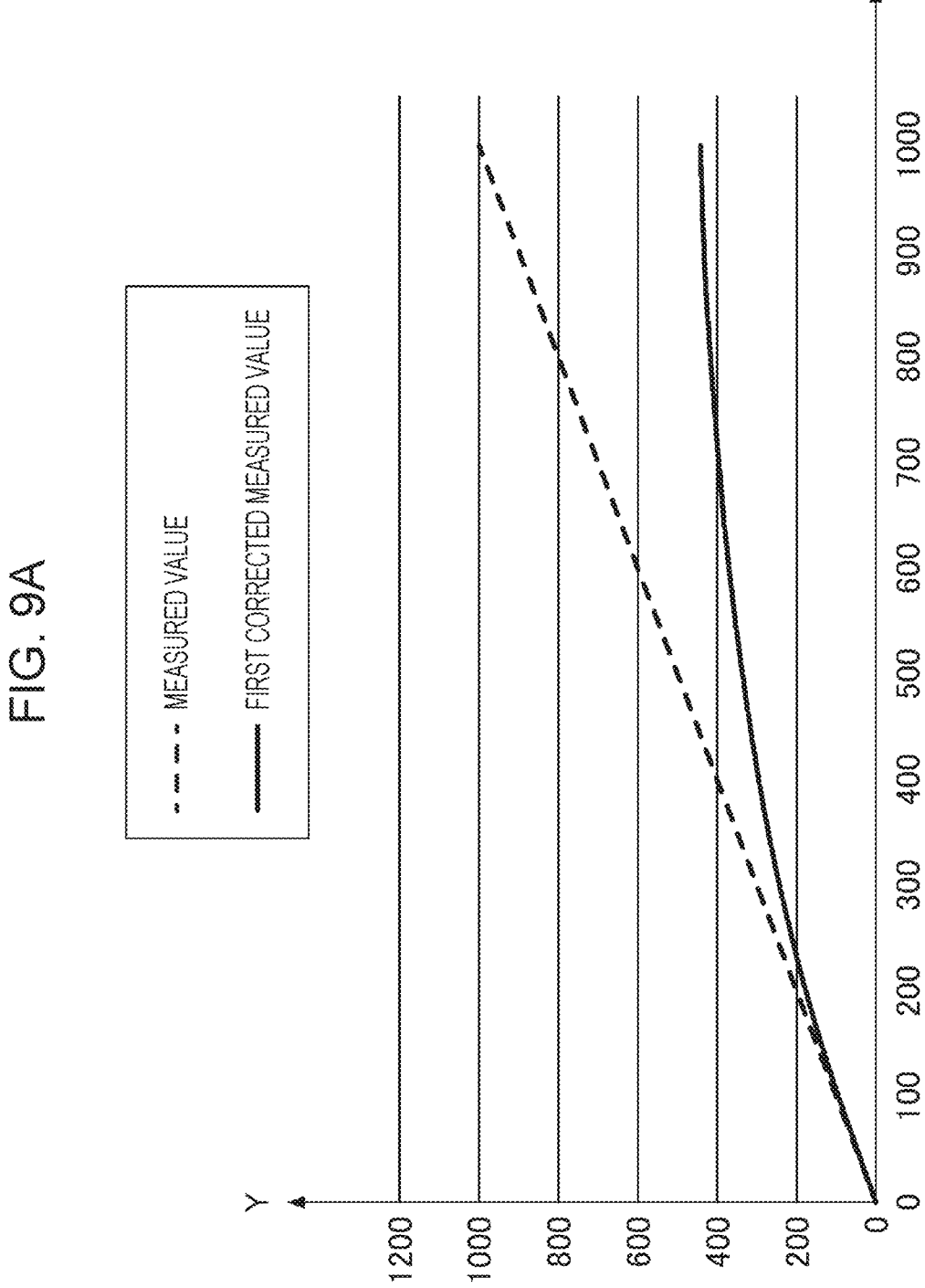
FIG. 9A is a diagram of an example variation of the characteristics of first corrected measured values.
Figure 9B:
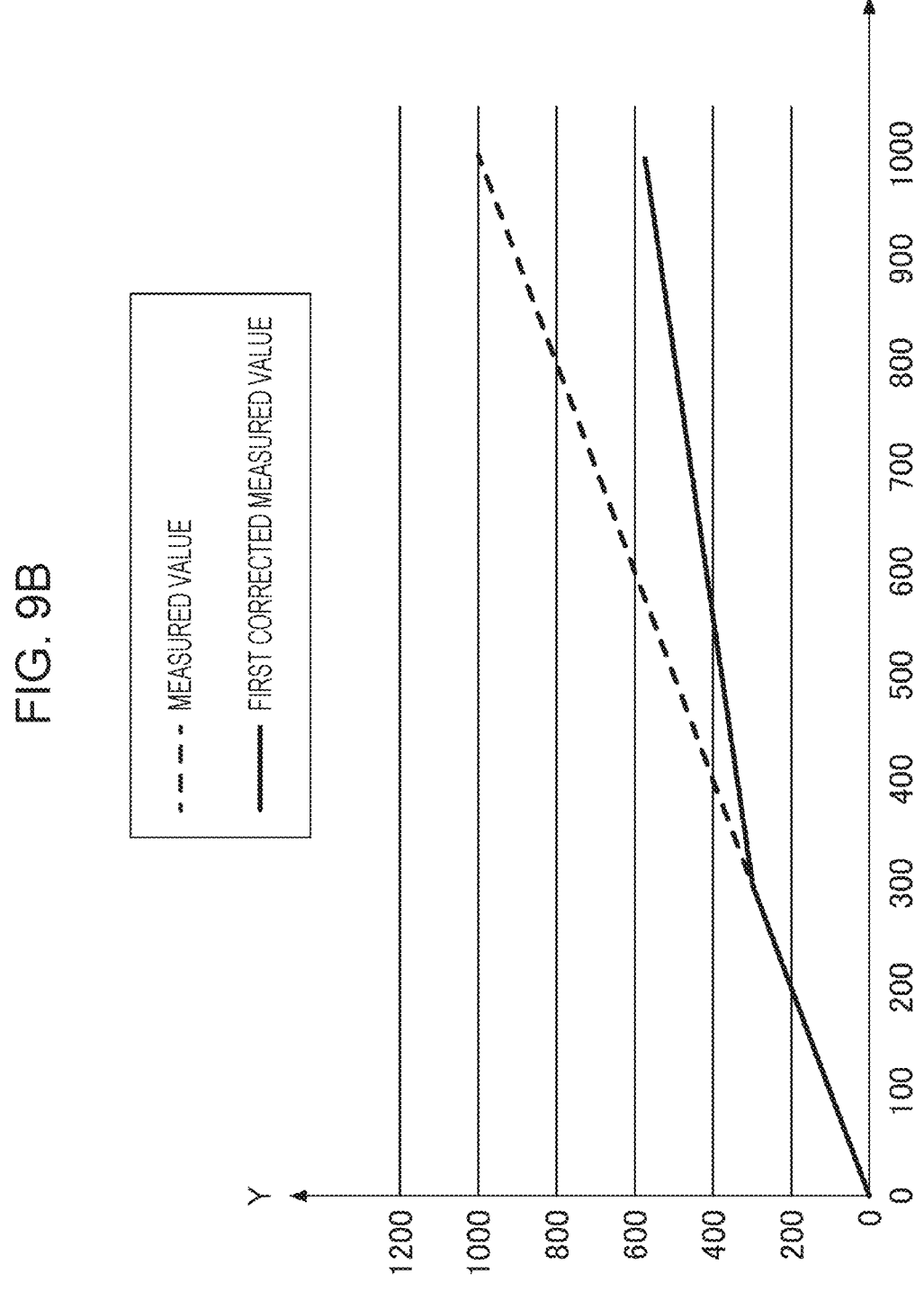
FIG. 9B is a diagram of an example variation of the characteristics of first corrected measured values.
Figure 9C:
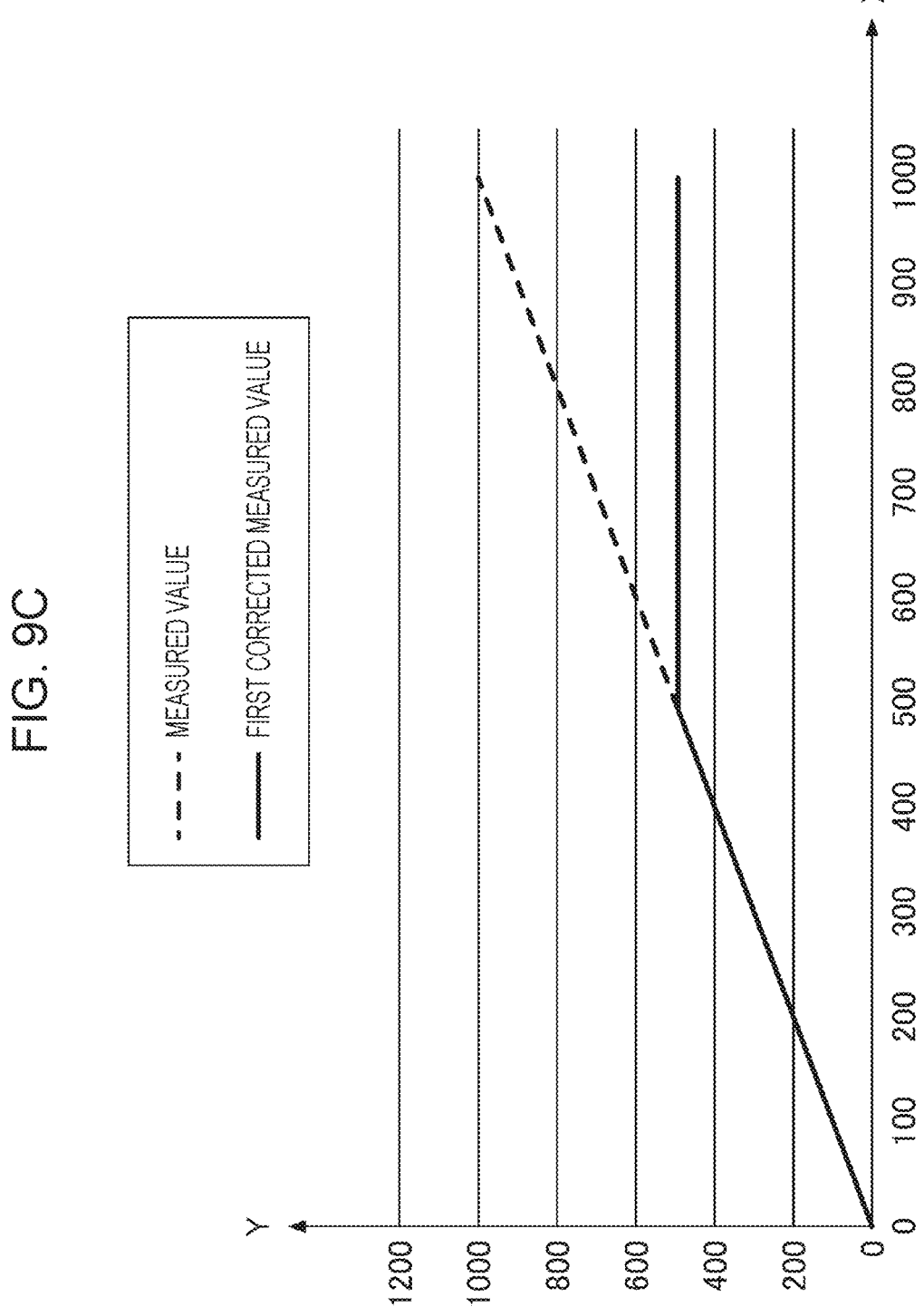
FIG. 9C is a diagram of an example variation of the characteristics of first corrected measured values.

In the above description, as shown in FIG. 5 by the solid line, the characteristics of the first corrected measured values can be expressed as the quadratic function that passes through the origin, opens downward, and lies below the line Y=X in the coordinate plane with the X axis and the Y axis. However, the characteristics of the first corrected measured values are not limited to the characteristics expressed by such a quadratic function, and may be the characteristics shown in FIG. 9A to FIG. 9C. FIG. 9A to FIG. 9C are examples of variations of the characteristics of the first corrected measured values.

<Characteristics of First Corrected Measured Values Shown in FIG. 9A>

The characteristics of the first corrected measured values shown by the solid line in FIG. 9A are expressed as a function that passes through the origin, lies below the line Y=X, and decreases exponentially in the coordinate plane with the X axis and the Y axis. The exponentially decreasing function is a continuously differentiable function. As an example of such a function, the function represented by the following equation (7) may be used. The first corrected measured values with such characteristics may be used.

$$Y = k1\left(1 - e^{-\frac{X}{k2}}\right) \tag{7}$$

When the characteristics of the first corrected measured values shown by the solid line in FIG. 9A are used, as the values of the measured values on the horizontal axis X increase, the difference from the measured values increases nonlinearly.

<Characteristics of First Corrected Measured Values Shown in FIG. 9B>

The characteristics of the first corrected measured values shown by the solid line in FIG. 9B are, in the coordinate plane with the X axis and the Y axis, characteristics that pass through the origin, are equal to the line Y=X in the range where X is 0 to 300, but in the range where X is 300 or greater, bend below the line Y=X, and have a gentler slope than the line Y=X. The first corrected measured values with such characteristics may be used.

The characteristics of the first corrected measured values shown by the solid line in FIG. 9B can be expressed as $Y=\alpha X-\beta$ in the range where X is 300 to 1000, where a is a positive constant less than 1, and B is a positive constant. Such an equation can be obtained by subtracting a first constant from a measured value represented by Y=X, multiplying the result by a second constant, and adding a third constant to the result. As an example, the characteristics of the first corrected measured values shown in FIG. 9B is expressed as $Y=300+(X-300)\times0.4$. The first constant is 300 in X−300, the second constant is 0.4, and the third constant is 300 in 300+.

When the characteristics of the first corrected measured values shown in FIG. 9B are used, when the measured values on the horizontal axis X become a predetermined value (300) or greater, the difference from the measured values expressed by the broken line increases linearly. It should be noted that the characteristics may be characteristics that when the measured values on the horizontal axis X become the predetermined value (300) or greater, the difference from the measured values expressed by the broken line increases nonlinearly.

<Characteristics of First Corrected Measured Values Shown in FIG. 9C>

The characteristics of the first corrected measured values shown in FIG. 9C are, in the coordinate plane with the X axis and the Y axis, characteristics that pass through the origin, are equal to the line Y=X in the range where X is 0 to 500, but in the range where X is 500 or greater, bend below the line Y=X, and become constant at Y=500. The first corrected measured values with such characteristics may be used.

When the characteristics of the first corrected measured values shown in FIG. 9C are used, when the measured values on the horizontal axis X become a predetermined value (500) or greater, the difference from the measured values expressed by the broken line increases linearly.

<Advantages>

The coordinate input device 100 includes the insulating substrate 125, the sensor electrodes 121X and 121Y that have the plurality of intersections (detection points) and are disposed on the insulating substrate 125, the top panel 105 that has the operation surface that can be operated by using the fingertip FT (operation body) and covers the sensor electrodes 121X and 121Y, the AD conversion unit 132 and the counter 133 (measurement circuit) that measure capacitance at each of the plurality of intersections, and the calculation unit 134 (calculation circuit) that calculates a position of the operation body in two-axis directions on the operation surface based on the measured values of the capacitance at the plurality of detection points. The calculation unit 134, for each of three or more measured values including the maximum value of the plurality of measured values obtained at the plurality of detection points, corrects the measured value and calculates a first corrected measured value to reduce differences between the three or more measured values including the maximum value, and calculates the position of the operation body in the two-axis directions on the operation surface using the first corrected measured value corresponding to the maximum value and the first corrected measured values corresponding to the measured values adjacent to the maximum value in one of the two-axis directions. As the measured values became larger, when the measured values are corrected and the first corrected measured values are calculated, the ratio at which the first corrected measured values are reduced is increased. In other words, the value obtained by dividing the first corrected measured value of the measured value adjacent to the position at which the maximum value is measured by the first corrected measured value of the maximum value is greater than the value obtained by dividing the measured value adjacent to the position at which the maximum value is measured by the maximum value. With this configuration, when large sensor electrodes are used to increase detection sensitivity, the occurrence of errors cam be reduced by preventing that the central position of the operation body is calculated as a position closer to the central position of the electrode than the actual position.

Accordingly, in the coordinate input device 100 with increased detection sensitivity, the occurrence of errors can be reduced.

The calculation unit 134 can calculate the first corrected measured values such that the differences between the measured values and the first corrected measured values increase nonlinearly as the measured values (difference values $\Delta AD$) increase, or calculate the first corrected measured values such that the differences between the measured values and the first corrected measured values increase nonlinearly or linearly when the measured values become greater than or equal to a predetermined value.

In addition, the calculation unit 134 corrects the measured values using a function that represents the first corrected measured values of the measured values, passes through the origin at which both of the measured value and the first corrected measured value are zero, and is continuously differentiable. With this configuration, the relationship between the measured values and the first corrected measured values changes smoothly, and when the fingertip FT is moved along the operation surface 105A at a constant speed, it is possible to suppress discontinuous changes in the calculated speed.

The calculation unit 134 calculates the first corrected measured values using a function that represents the first corrected measured values of the measured values, and that is a quadratic function, in a coordinate plane with an X-axis and a Y-axis, when the measured value is X and the first corrected measured value is Y, passes through the origin and opens downward. Accordingly, the coordinate input device 100 capable of calculating first corrected measured values with relatively little computation and achieving both improved detection sensitivity and increased detection accuracy can be provided.

The quadratic function is a quadratic function that has a vertex corresponding to the first corrected measured value corresponding to the maximum value of the measured values. Experiments have confirmed that increasing the correction ratio of the measured value at the intersection directly under the center of the fingertip FT improves the detection accuracy of the position of the fingertip FT.

Accordingly, the detection accuracy of the position of the fingertip FT can be increased with relatively little computation.

The calculation unit 134 calculates the first corrected measured value Y using the following equation (8):

$$Y = K1 \times X \times (K2 - X/Cmax) \qquad (8)$$

where the measured value is X, the first corrected measured value is Y, and the maximum value is Cmax.

In the equation, K is a constant less than 1, and K2 is a value in the range of 1.7 to 2.3. The coefficient K2 can be determined simply by deciding how much to reduce the maximum value of measured values obtained at the intersection directly under the center of the fingertip FT, thereby facilitating design.

The calculation unit 134 calculates the first corrected measured values using a function in which the first corrected measured values of the measured values decrease exponentially. Accordingly, the relationship between the measured values and the first corrected measured values changes smoothly, and when the fingertip FT is moved along the operation surface 105A at a constant speed, it is possible to suppress discontinuous changes in the calculated speed.

The calculation unit 134 does not correct the measured values when the measured vales are less than the predetermined value, and calculates the first corrected measured values when the measured values become greater than or equal to the predetermined value. By using the simple relational expression, first corrected measured values can be calculated based on measured values.

The calculation unit 134 calculates the first corrected measured values when the measured values are greater than or equal to the predetermined value by subtracting a first constant from the measured value, multiplying the result by a second constant, and adding a third constant to the result. By using the relatively simple relational expression, first corrected measured values can be calculated based on measured values.

When the measured values are greater than or equal to the predetermined value, the calculation unit 134 calculates the first corrected measured values by correcting the measured values to a constant value. By using the simple relational expression, first corrected measured values can be calculated based on measured values.

The calculation unit 134 is configured to calculate distances from the sensor electrodes 121X and 121Y to the operation body, and when the maximum value of the plurality of measured values is greater than or equal to a contact threshold value for determining whether the operation body and the operation surface are in contact with each other, calculates the position of the operation body in the two-axis directions on the operation surface using the first corrected measured value corresponding to the maximum value and the first corrected measured values corresponding to the measured values adjacent to the maximum value in one of the two-axis directions, and when the maximum value of the plurality of measured values is less than the contact threshold value, for each of the three or more measured values including the maximum value, calculates a second corrected measured value by weighted averaging by weighting the measured value and the first corrected measured value corresponding to the measured value according to a ratio of the maximum value of the plurality of measured values to the contact threshold value, and calculates the position of the operation body in the two-axis directions on the operation surface using the second corrected measured value corresponding to the maximum value and the second corrected measured values corresponding to the measured values adjacent to the maximum value in one of the two-axis directions. For example, when measured values (difference values ΔAD) obtained at the intersections of the sensor electrodes 121X and 121Y are small compared with those in a contact operation, by using second corrected measured values, the XY coordinates of the fingertip FT can be readily calculated.

The calculation unit 134 fits a quadric curve to the first corrected measured value corresponding to the maximum value and the first corrected measured values corresponding the measured values adjacent to the maximum value in one of the two-axis directions, and calculates the position of a vertex of the quadric curve as the position of the operation body in the two-axis directions on the operation surface. Accordingly, as the position of a vertex of the quadric curve fitted to the first corrected measured values, the position of the fingertip FT can be calculated with high accuracy. This is particularly useful when the distance between the sensor electrodes 121X and 121Y is wide (or equivalent) relative to the width of the fingertip FT.

The calculation unit 134 calculates a position of a centroid obtained by weighting the first corrected measured values greater than or equal to a threshold value out of the first corrected measured value corresponding to the maximum value and the first corrected measured values corresponding to the measured values adjacent to the maximum value as the position of the operation body in the two-axis directions on the operation surface. As the position of a centroid fitted to the first corrected measured values, the position of the fingertip FT can be calculated with high accuracy. This is particularly useful when the distance between the sensor electrodes 121X and 121Y is narrow relative to the width of the fingertip FT.

The calculation unit 134, when the maximum value of the plurality of measured values is greater than or equal to the contact threshold value, fits a quadric curve to the first corrected measured value corresponding to the maximum value and the first corrected measured values corresponding the measured values adjacent to the maximum value in one of the two-axis directions, and calculates the position of a vertex of the quadric curve as the position of the operation body in the two-axis directions on the operation surface, and when the maximum value of the plurality of measured values is less than the contact threshold value, fits a quadric curve to the second corrected measured value corresponding to the maximum value and the second corrected measured values corresponding the measured values adjacent to the maximum value in one of the two-axis directions, and calculates the position of a vertex of the quadric curve as the position of the operation body in the two-axis directions on the operation surface. Depending on the relationship between the maximum value of a plurality of measured values and a contact threshold value, a curve approximation method with high detection accuracy of the fingertip FT position can be selected.

The calculation unit 134, when the maximum value of the plurality of measured values is greater than or equal to the contact threshold value, calculates a position of a centroid obtained by weighting the first corrected measured values greater than or equal to the threshold value out of the first corrected measured value corresponding to the maximum value and the first corrected measured values corresponding to the measured values adjacent to the maximum value as the position of the operation body in the two-axis directions on the operation surface, and when the maximum value of the plurality of measured values is less than the contact threshold value, calculates a position of a centroid obtained by weighting the second corrected measured values greater than or equal to the threshold value out of the second corrected measured value corresponding to the maximum value and the second corrected measured values corresponding to the measured values adjacent to the maximum value as the position of the operation body in the two-axis directions on the operation surface. Depending on the relationship between the maximum value of a plurality of measured values and a contact threshold value, a centroid calculation method with high detection accuracy of the fingertip FT position can be selected.

Although the coordinate input device according to the exemplary embodiments of the disclosure has been described above, it is to be understood that the disclosure is not limited to these embodiments disclosed specifically, and various modifications or changes may be made without departing from the scope of the claims.

What is claimed is:

1. A coordinate input device comprising:
an insulating substrate;
a plurality of sensor electrodes disposed on the insulating substrate and having a plurality of detection points;
a top panel covering the plurality of sensor electrodes, the top panel having an operation surface to be operated by an operation body;
a measurement circuit configured to measure a capacitance at each of the plurality of detection points, thereby providing a plurality of measured values of the capacitance; and
a calculation circuit configured to calculate a position of the operation body in two-axis directions on the operation surface based on the plurality of measured values of the capacitance,
wherein the calculation circuit is further configured to:
correct at least three measured values including a maximum measured value from among the plurality of measured values so as to reduce differences among the at least three measured values including the maximum measured value, thereby obtaining corresponding at least three first corrected values; and
calculate the position of the operation body in the two-axis directions on the operation surface using one of the at least three first corrected values corresponding to the maximum measured value and two of the at least three first corrected values corresponding to adjacent measured values among the at least three measured values which are adjacent to the maximum measured value in one of the two-axis directions.

2. The coordinate input device according to claim 1, wherein each first corrected value is smaller than the corresponding measured value,
and wherein the calculation circuit is further configured to calculate the first corrected value such that the difference between the measured value and the first corrected value increases nonlinearly as the measured value increases, or such that the difference between the measured value and the first corrected value increases nonlinearly or linearly when the measured value becomes equal to or greater than a predetermined value.

3. The coordinate input device according to claim 2, wherein the calculation circuit is configured to calculate the first corrected value as a function of the measured value, the function being a continuously differentiable function that passes through an origin at which both of the measured value and the first corrected value are zero.

4. The coordinate input device according to claim 2, wherein the calculation circuit is configured to calculate the first corrected value as a function of the measured value, the function being a quadratic function which passes through an origin in a coordinate plane with an X-axis for the measured value and a Y-axis for the first corrected value, and opens downward.

5. The coordinate input device according to claim 4, wherein the quadratic function has a vertex corresponding to the first corrected value corresponding to the maximum measured value.

6. The coordinate input device according to claim 2, wherein the calculation circuit is configured to calculate the first corrected value Y from, the measured value is X and the maximum value is Cmax, using Equation (1) below:

$$Y = K1 \times X \times (K2 - X/Cmax), \tag{1}$$

where K is a constant less than 1, and K2 is a value in a range of 1.7 to 2.3.

7. The coordinate input device according to claim 2, wherein the calculation circuit is configured to calculate the first corrected value values as a function of the measured value, in which the first corrected value exponentially decreases with respect to the measured value.

8. The coordinate input device according to claim 2, wherein the calculation circuit is further configured not to correct the measured value when the measured value is less than the predetermined value, and to calculate the first corrected value when the measured value becomes greater than or equal to the predetermined value.

9. The coordinate input device according to claim 8, wherein the calculation circuit is configured to calculate the first corrected value, when the measured value is equal to or greater than the predetermined value, by subtracting a first constant from the measured value, multiplying a result of the subtraction by a second constant, and adding a third constant to a result of the multiplication.

10. The coordinate input device according to claim 8, wherein the calculation circuit is configured to calculate the first corrected value, when the measured value is equal to or greater than the predetermined value, by replacing the measured values with a predetermined constant value.

11. The coordinate input device according to claim 1, wherein the calculation circuit is further configured to calculate distances from the sensor electrodes to the operation body and to determine whether the operation body is in contact with the operation surface using a contact threshold value,
wherein the calculation circuit calculates, when the maximum measured value is equal to or greater than the contact threshold value, the position of the operation body using the first corrected values corresponding to the maximum measured value and the adjacent measured values adjacent to the maximum measured value in the two-axis directions, and
wherein the calculation circuit calculates, when the maximum measured value is smaller than the contact threshold value, a second corrected value for each of the at least three measured values including the maximum measured value, by weighted-averaging the measured value and the first corrected value thereof according to a ratio of the maximum measured value to the contact threshold value, thereby calculating the position of the operation body using the second corrected values corresponding to the maximum measured value and the adjacent measured values adjacent to the maximum measured value in the one of the two-axis directions.

12. The coordinate input device according to claim 1, wherein the calculation circuit is configured to fit a quadric curve to the first corrected values corresponding to the maximum measured value and the measured values adjacent to the maximum measured in the one of the two-axis directions, thereby calculating a position of a vertex of the quadric curve as the position of the operation body.

13. The coordinate input device according to claim 1, wherein the calculation circuit is configured to calculate a position of a center of gravity obtained by weighting the first corrected values which are equal to or greater than a threshold value from among the first corrected values corresponding to the maximum measured value and the adjacent measured values adjacent to the maximum measured value as the position of the operation body.

14. The coordinate input device according to claim 11, wherein the calculation circuit is configured, when the maximum measured value is equal to or greater than the contact threshold value, to fit a quadric curve to the first corrected values corresponding to the maximum measured value and the adjacent measured values adjacent to the maximum value in the one of the two-axis directions, thereby calculating a the position of a vertex of the quadric curve as the position of the operation body, and

wherein the calculation circuit is configured, when the maximum measured value is smaller than the contact threshold value, to fit a quadric curve to the second corrected values corresponding to the maximum measured value and the adjacent measured values corresponding the adjacent to the maximum measured value in the one of the two-axis directions, thereby calculating the position of the vertex of the quadric curve as the position of the operation body.

15. The coordinate input device according to claim 11, wherein the calculation circuit is configured, when the maximum measured value is equal to or greater than the contact threshold value, to calculate a position of a center of gravity obtained by weighting the first corrected values equal to or greater than a threshold value from among the first corrected values corresponding to the maximum measured value and the adjacent measured values adjacent to the maximum measured value as the position of the operation body, and the calculation unit is configured, when the maximum measured value is smaller than the contact threshold value, to calculate a position of a center of gravity obtained by weighting the second corrected values equal to or greater than the threshold value from among the second corrected value corresponding to the maximum measured value and the adjacent measured values adjacent to the maximum measured value as the position of the operation body.

* * * * *